United States Patent
Tutt et al.

(10) Patent No.: US 7,127,788 B2
(45) Date of Patent: Oct. 31, 2006

(54) CONDUIT COUPLING SYSTEM, TOOL AND METHOD

(76) Inventors: Milton Wayne Tutt, 725 County Rd. 187, Gainesville, TX (US) 76240; Dennis M. Turner, 8387 E. US Hwy. 82, Gainesville, TX (US) 76240

(*) Notice: Subject to any disclaimer, the term of this patent is extended or adjusted under 35 U.S.C. 154(b) by 274 days.

(21) Appl. No.: 10/730,787

(22) Filed: Dec. 9, 2003

(65) Prior Publication Data
US 2005/0120539 A1    Jun. 9, 2005

(51) Int. Cl.
*B25B 27/14* (2006.01)
(52) U.S. Cl. .............................. 29/272; 29/282; 29/237; 285/39
(58) Field of Classification Search ................ 29/272, 29/282, 237; 285/23, 39
See application file for complete search history.

(56) References Cited

U.S. PATENT DOCUMENTS

| | | | |
|---|---|---|---|
| 0,689,045 A | 12/1901 | Fruin et al. | |
| 1,817,776 A * | 8/1931 | Sipe | 285/340 |
| 1,926,197 A | 9/1933 | Dun | |
| 2,459,956 A | 1/1949 | Muller | |
| 2,615,741 A | 10/1952 | Nathan | |
| 3,248,135 A | 4/1966 | Meripol | |
| 3,266,821 A | 8/1966 | Safford | |
| 3,682,503 A | 8/1972 | Bloom | |
| 4,054,984 A * | 10/1977 | Ball et al. | 29/237 |
| 4,097,070 A | 6/1978 | Acda | |
| 4,580,816 A | 4/1986 | Campbell et al. | |
| 4,657,286 A | 4/1987 | Guest | |
| 4,757,588 A * | 7/1988 | Churchich | 29/235 |
| 4,779,902 A | 10/1988 | Lee | |
| 4,824,145 A | 4/1989 | Carlsson | |
| 4,893,393 A * | 1/1990 | Marshall | 29/237 |
| 4,893,848 A | 1/1990 | Melcher | |
| 4,969,670 A | 11/1990 | Bonnema et al. | |
| 4,993,756 A | 2/1991 | Bechu | |
| 5,018,768 A * | 5/1991 | Palatchy | 285/24 |
| 5,180,197 A | 1/1993 | Thompson, Jr. | |
| 5,186,500 A | 2/1993 | Folkers | |
| 5,213,375 A | 5/1993 | Wu | |
| 5,833,276 A | 11/1998 | Thompson, Jr. | |

FOREIGN PATENT DOCUMENTS

| | | |
|---|---|---|
| AU | 133670 | 3/1946 |
| DE | 836 770 | 4/1952 |
| DE | 840489 | 6/1952 |
| DE | 29 38 006 A1 | 3/1981 |
| GB | 220747 | 2/1989 |
| SU | 985583 A | 12/1982 |

* cited by examiner

Primary Examiner—David P. Bryant
Assistant Examiner—Christopher M. Koehler
(74) Attorney, Agent, or Firm—Mark E. Brown

(57) ABSTRACT

A system for coupling conduit sections includes a coupling tool with a pair of lever arms pivotally interconnected and each mounting a clamp assembly. The clamp assemblies are adapted for releasably clamping the conduit sections. A coupling has a generally tubular configuration with a throughbore with multiple annular internal ribs. A coupling method includes the steps of clamping first and second conduit sections with respective clamping assemblies, placing the conduit section ends against the coupling throughbore ends, and squeezing the tool lever arms together whereby the conduit section ends are inserted into the coupling throughbore in fluid-tight sealing and pull-out resistant engagement.

1 Claim, 4 Drawing Sheets

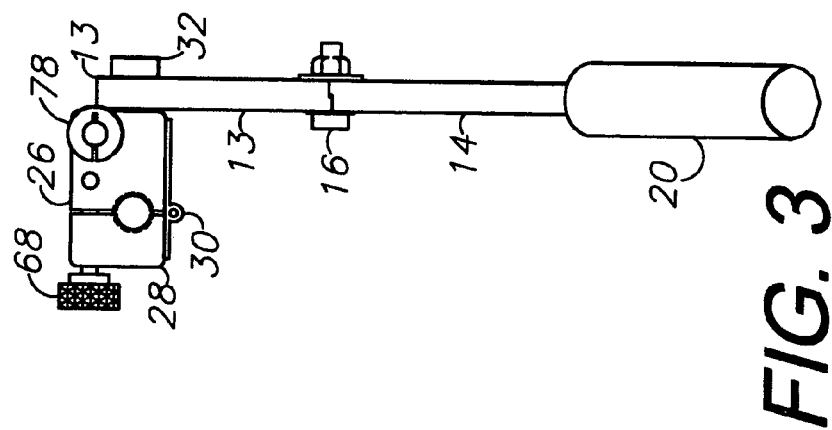
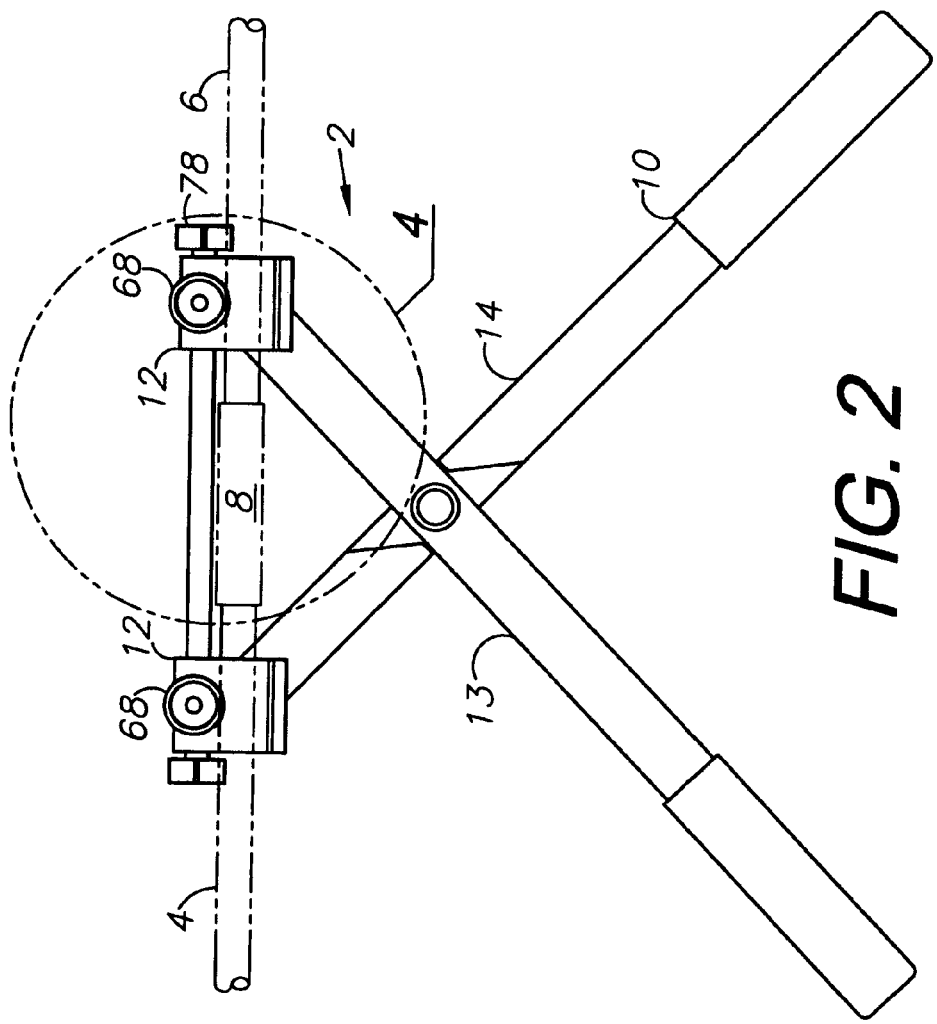

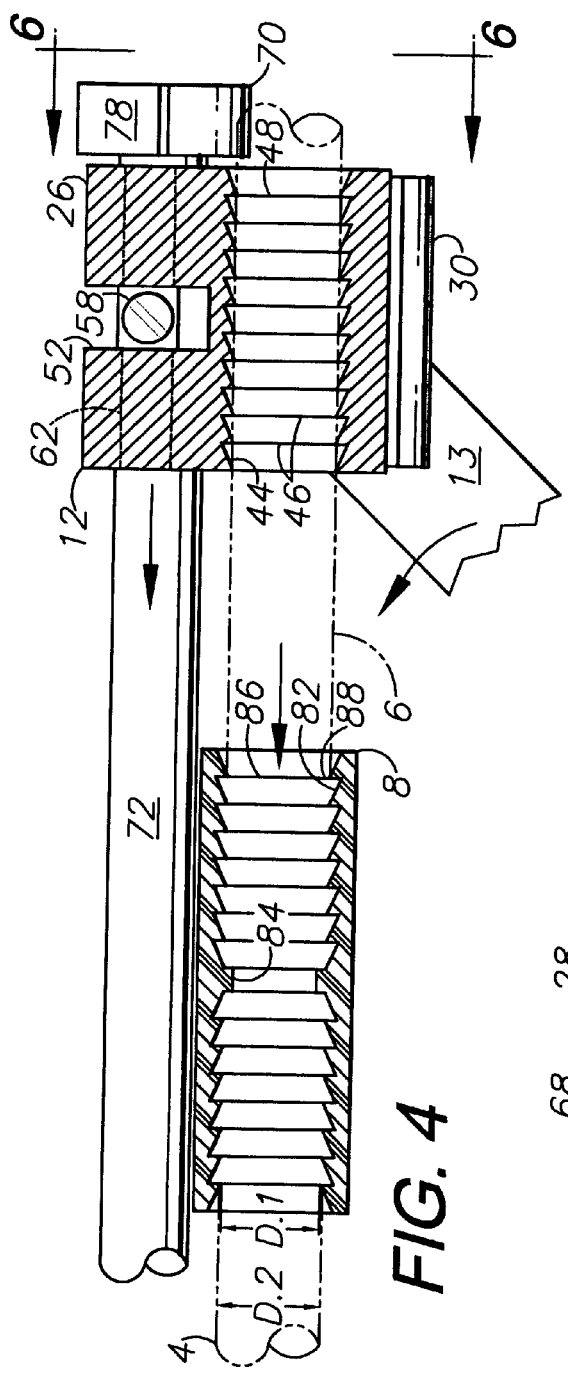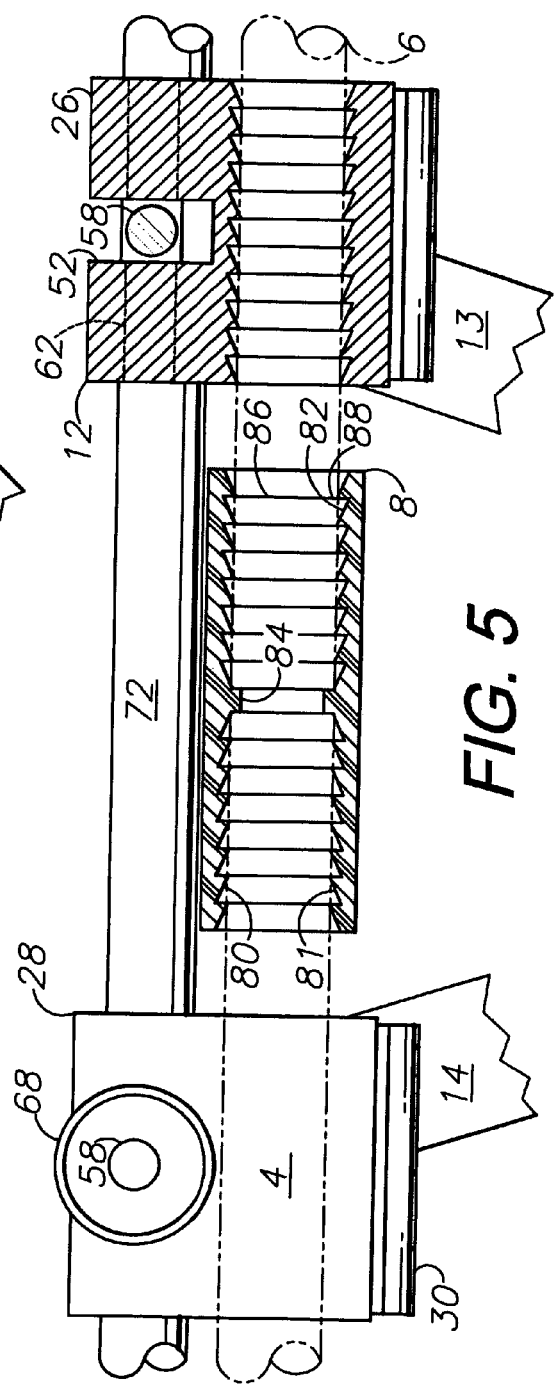

CONDUIT COUPLING SYSTEM, TOOL AND METHOD

BACKGROUND OF THE INVENTION

1. Field of the Invention

The present invention relates generally to conduit or pipe couplings, and in particular to a system, tool and method for pushing the ends of a pair of plastic conduit sections into a coupling to form a fluid-tight, pull-out resistant coupling therebetween.

2. Discussion of the Related Art

Couplings and fittings of various types are used for joining pipes and conduits. Examples include threaded fittings, couplings that are secured with solvent adhesives, weldments and various push-type couplings. The performance criteria for pipe coupling mechanisms are generally determined by such factors as the pipe materials, design pressures, temperature ranges, fluid-tight requirements, pull-out resistance requirements and environmental conditions.

For example, the nationwide, fiber-optic, telecommunications networks consist largely of buried fiber-optic cables. The cables are commonly protected from groundwater and other subsurface conditions by enclosing them within plastic conduits. A common fiber-optic cable installation procedure involves placing the empty conduits below grade with special trenching and tunnel-boring equipment, whereafter the fiber-optic cables are blown through the conduit with high-pressure air. The plastic conduits and the connecting fittings used in such installations must be impervious to groundwater, resistant to the corrosive effects of soil and capable of maintaining relatively high internal air pressures. Therefore, the connecting fittings or couplings used for joining the conduit sections require sufficient pull-out resistance to withstand internal air pressures, and further to resist tensile forces tending to separate the conduit sections by pulling apart their connections.

Conduit coupling systems are commonly used in adverse field and environmental conditions where only minimal equipment is available and speed is relatively important. Therefore, machining and other preparation of the conduit sections ends should be eliminated or minimized. Manually-operated hand tools are generally preferred due to their portability and independence from external power sources. Moreover, the couplings and other fittings should be relatively simple, inexpensive, strong and reliable. Still further, the bores of the aligned conduit sections should be free from obstructions after they are coupled.

Heretofore there has not been available a conduit coupling system, tool and method with the advantages and features of the present invention.

BRIEF DESCRIPTION OF THE INVENTION

In the practice of one aspect of the present invention, a coupling system, tool and method are provided for continuously fluidically connecting a pair of conduit sections with a coupling having internal, annular ribs adapted and oriented to pass the conduit section ends one-way into the coupling and to resist pull-out in the opposite direction. The tool comprises a pivotally interconnected pair of lever arms each mounting a respective clamp assembly. Practicing an aspect of the method of the present invention involves clamping the conduit sections with the clamp assemblies, spreading the lever arms to their open position, placing a coupling between the conduit sections ends and closing the lever arms whereby the conduit section ends are pushed into and fixedly received in the coupling. Pull-out resistance is provided by the coupling internal ribs, which impinge on the conduit sections for securely retaining same in fluid-tight engagement with the coupling.

BRIEF DESCRIPTION OF THE DRAWINGS

The drawings constitute a part of this specification and include exemplary embodiments of the present invention and illustrate various objects and features thereof.

FIG. 2 is a front elevational view thereof.

FIG. 3 is a side elevational view thereof.

FIG. 4 is an enlarged, fragmentary, cross-sectional view of a clamp assembly and the coupling, taken generally within circle 4 in FIG. 2 and showing the conduit section ends in phantom lines and in position for insertion into the coupling with the coupling tool in its open position.

FIG. 5 is an enlarged, front elevational view of the clamp assembly on the left and a cross-sectional view of the clamp assembly on the right and the coupling, with the conduit section ends fixedly embedded in the coupling and the coupling tool in its closed position.

DETAILED DESCRIPTION OF THE INVENTION

I. Introduction and Environment

Figure 1:
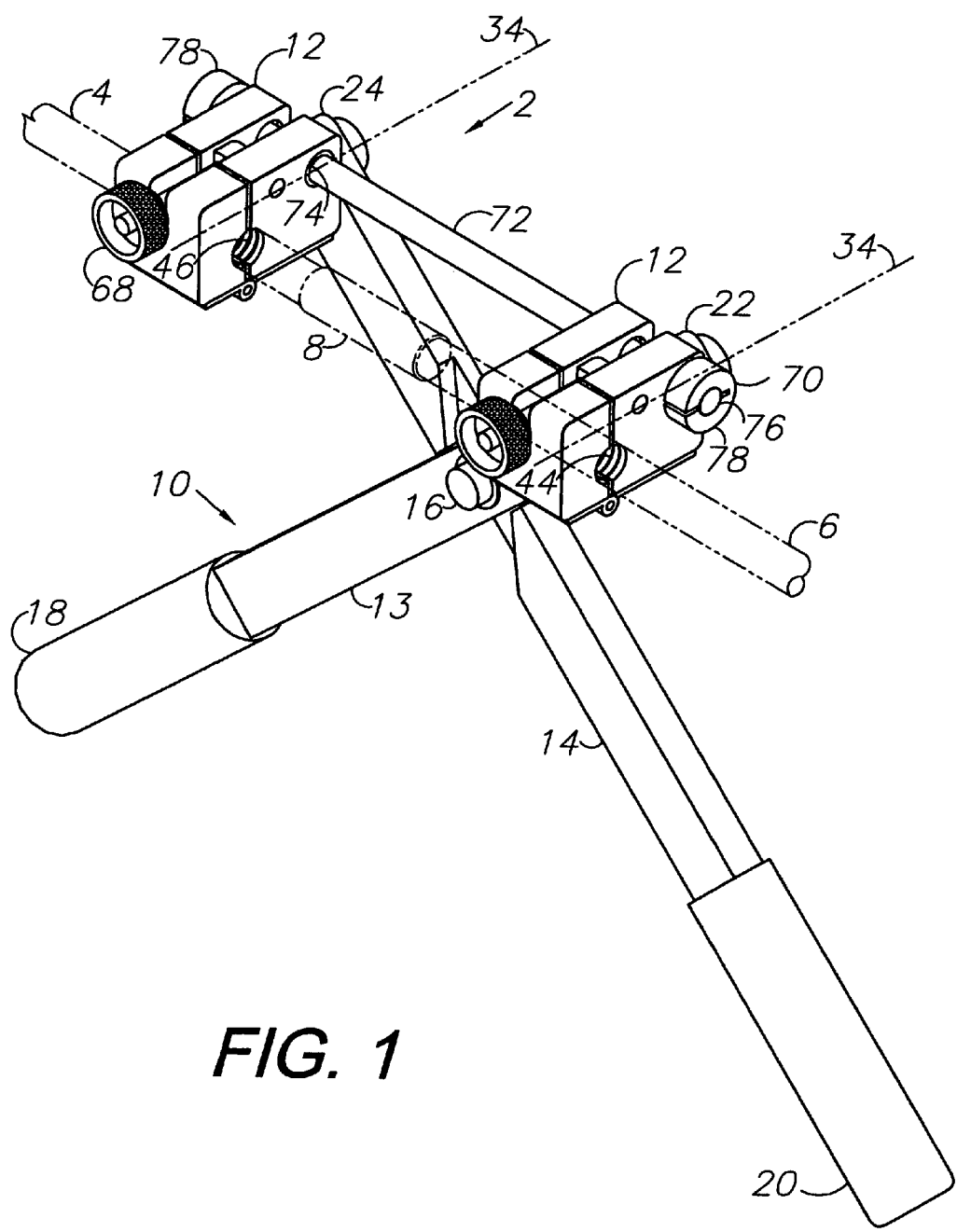
FIG. 1 is a perspective view of a conduit coupling tool embodying an aspect of the present invention, with the conduit sections and the coupling shown in phantom lines.

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a coupling tool adapted for inserting the ends of conduit sections 4, 6 into a tubular coupling 8. Without limitation on the generality of useful applications of the coupling tool 2, the conduit sections 4, 6 can comprise various suitable plastics, such as polyvinyl chloride (PVC) polyethylene, polypropylene, etc. The tool 2 generally comprises a lever assembly 10 and a pair of clamp assemblies 12 mounted thereon.

II. Coupling Tool 2

The lever assembly 10 comprises a pair of lever arms 13, 14, which are pivotally interconnected by a pivot connector 16. The lever arms 13, 14 include respective, proximal handle ends 18, 20 and distal ends 22, 24, which mount the clamp assemblies 12.

Figure 6:
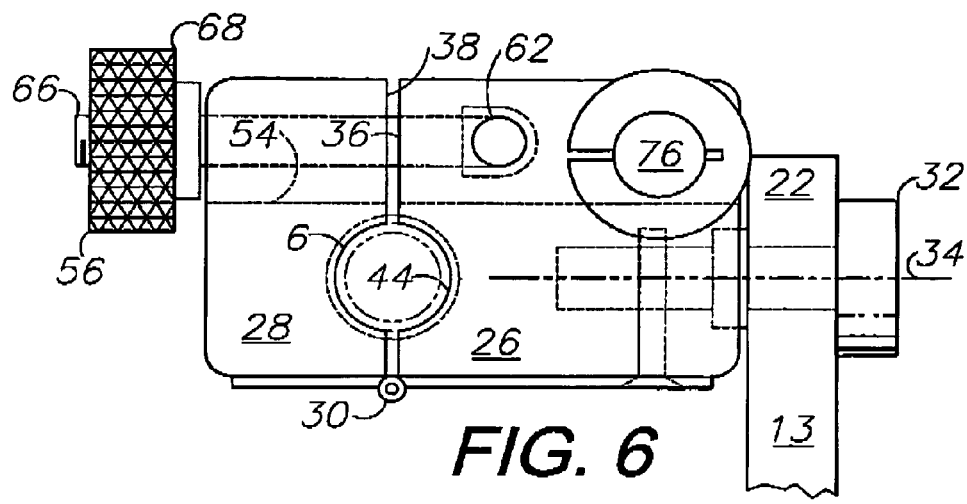
FIG. 6 is an enlarged, side elevational view of a clamp assembly taken generally along line 6—6 in FIG. 4, with the clamp assembly in its closed position.
Figure 7:
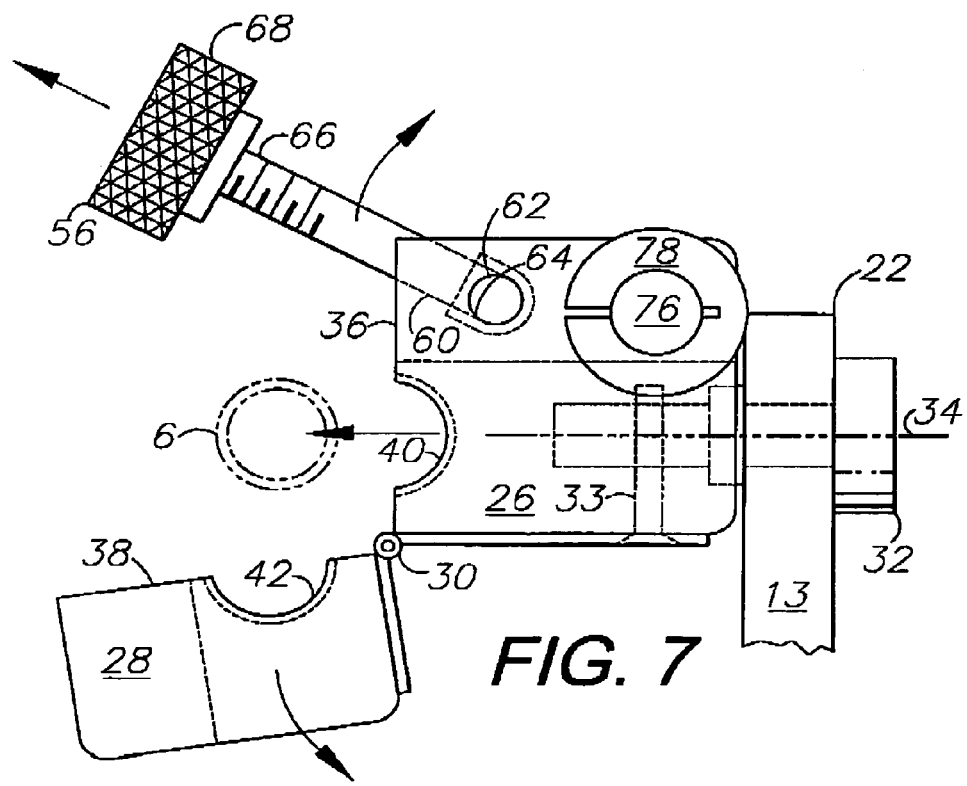
FIG. 7 is an enlarged, side elevational view of the clamp assembly in its open position with a conduit section being extracted therefrom.

Each clamp assembly 12 includes a stationary jaw 26 and a movable jaw 28 movably mounted thereon by a hinge 30 attached to the undersides of the jaws 26, 28. The stationary jaw 26 is rotatably mounted on a respective lever arm distal end 22 or 24 by an axle 32, with a coaxial rotational axis 34 extending perpendicularly from the lever arm distal end 22 or 24. The axle 32 is fixedly retained in place in the stationary jaw 26 by an axle retainer screw 33, which extends through the hinge 30, the axle 32 and into the stationary jaw 26 (FIGS. 6 and 7). The jaws 26, 28 include respective engagement faces 36, 38 with respective conduit receiver halves 40, 42. With the jaws 26, 28 closed, the receiver halves 40, 42 are positioned in opposed relation to form a conduit receiver 44 (FIG. 6). Each receiver half 40, 42 includes multiple, semi-circular arcuate receiver ribs 46 with sawtooth-shaped cross-sections forming engagement edges 48 adapted for grippingly engaging the conduit sections 4, 6 (FIGS. 4 and 5).

The jaws 26, 28 include respective latch channels 52, 54, which partially receive respective latch mechanisms 56 adapted for selectively latching and tightening the clamp assemblies 12. Each latch mechanism 56 includes a latch bolt 58 with an inner, retained end 60 mounting a cross pin 62 pivotally received in respective cross pin receivers 64 located on opposite sides of the stationary jaw 26 and its latch channel 52. Each latch bolt includes a threaded outer end 66 threadably mounting a knurled nut 68 adapted for manual tightening whereby the clamp assembly 12 securely clamps a respective conduit sections 4 or 6. An alignment mechanism 70 interconnects the clamp assemblies 12 and includes an alignment rod 72, which slidably extends through respective, transverse guide rod passages 74 formed in the stationary jaws 26. The rod 72 includes opposite ends 76 protruding beyond the stationary jaws 26 and mounting retainers 78, which are adapted for limiting the range of motion of the lever arms 13 at their maximum spread (FIG. 2).

III. Coupling 8 and Operation

In operation, the tool 2 is adapted for inserting the ends of the conduit sections 4, 6 into the coupling 8. The coupling 8 includes a throughbore 80 with first and second sections 81, 82, which are separated by an annular center stop 84 located approximately midway through the throughbore 80. Each throughbore section 81, 82 includes multiple, annular coupling ribs 86 with sawtooth-shaped cross-sectional configurations, which are somewhat similar to the configurations of the clamp jaw receiver ribs 46 (FIGS. 4 and 5). The coupling ribs 86 likewise define relatively sharp, annular engagement edges 88, with inside diameters D.1, which are slightly less than outside diameters D.2 of the conduit sections 4, 6. The coupling 8 preferably comprises a relatively hard material, such as polycarbonate, whereby the coupling rib edges 88 impinge on the conduit section outer surfaces, forming a fluid-tight, pull-out resistant sealing connection therebetween. The coupling 8 can comprise a transparent or translucent plastic material adapted for visual observation of the conduit section ends within the coupling. The contents of the conduits, such as fiber-optic cables, fluids and the like, can also be observed through a clear, see-through coupling. Alternatively, the coupling 8 can comprise another suitable material, such as metal. The sawtooth configuration of the coupling ribs 86 functions to permit one-way passage of the conduit sections 4, 6 into the coupling throughbore 80, while resisting pull-out in the opposite direction.

The conduit sections 4, 6 are placed in the clamp receivers 44 with the clamp assemblies 12 opened (FIG. 7), whereafter the clamp assemblies 12 are securely clamped on the conduit sections 4,6 by tightening the latch mechanism nuts 68 (FIG. 6) whereby the engagement edges 48 of the receiver ribs 46 impinge on the conduit sections 4, 6. With the lever assembly 10 in its closed position, the conduit sections 4, 6 can be properly positioned in the clamp assemblies 12 with their ends touching or nearly touching. The lever assembly 10 is then spread to provide clearance between the conduit section ends for the coupling 8 (FIGS. 2 and 4). The lever assembly 10 provides considerable leverage whereby substantial compressive forces can be applied for securely embedding the conduit section ends in the respective throughbore first and second sections 81, 82. The sawtooth configurations of the clamp receiver ribs 46 function to effectively resist slippage of the captured conduit sections 4,6 and effectively transmit compressive forces, which insert the conduit section ends into the coupling 8. The alignment mechanism 70 rotates the clamp assemblies 12 on the lever arms 13, 14 about the rotational axes 34 whereby the clamp assembly conduit receivers 44 are maintained in axial alignment with the conduit sections 4, 6 and the coupling 8.

It will be appreciated that the pull-out resistant coupling can be configured in various alternative aspects and embodiments within the scope of the present invention. For example, the tool 2 can be adapted for connecting conduit sections with various other types of fittings, such as reducers, Ts, elbows, etc. Moreover, external hydraulic, electrical or other power sources can be utilized for opening and closing the clamp assemblies.

What is claimed and desired to be secured by Letters Patent is as follows:

1. A system for coupling first and second conduit sections, which includes:
    a coupling with a generally cylindrical tubular configuration with opposite ends and a coupling bore extending between and open at said ends; said coupling bore having first and second sections adjacent said coupling ends respectively; and each said coupling bore section having multiple said annular coupling ribs with sawtooth-shaped cross-sectional configurations sloping inwardly and including annular engagement edges adapted far passing said conduit sections into said coupling through said coupling opposite ends and retaining same therein, said coupling bore including an annular stop located medially therein;
    a coupling tool including a pair of lever arms each having a proximal handle end and a distal end;
    said lever arms being pivotally interconnected intermediate their respective ends;
    said coupling tool further including a pair of clamp assemblies each having a closed position adapted for clapping a respective conduit section inside the clamp assembly and an open position adapted for releasing the conduit section;
    each said clamp assembly including a stationary jaw mounted on a respective lever arm distal end, a movable jaw hingedly mounted on said stationary jaw and a conduit receiver comprising first and second receiver portions each located on a respective jaw;
    each said movable jaw being pivotable between an open position with said receiver portions spaced from each other and a closed position with said receiver portions in opposed relation and forming said conduit receiver;
    each said conduit receiver including multiple annular ribs each having a sawtooth-shaped cross-sectional configuration sloping towards the interior of said coupling tool and including an engagement edge adapted for engaging said conduit;
    each said clamp assembly including a latch mechanism with a first component mounted on one of said jaws and a second component adapted for tightening on said first component and selectively engaging said movable jaw and retaining same in its closed position;

each said stationary jaw and said movable jaw including respective latch channels, which align with each other when said clamp assembly in its closed position each said clamp assembly including a latch mechanism with a first component mounted on one of said jaws and a second component adapted for tightening on said first component and selectively engaging said movable jaw and retaining same in its closed position, said first component comprising a threaded latch bolt pivotully mounted on said stationary jaw and located in said latch channels with said clamp assembly in its closed position and said second component comprising a nut threadably mounted on said bolt and selectively engaging said movable jaw said clamp assembly in its closed position;

each said clamp assembly including a transverse passage;

said coupling tool including an alignment rod with opposite ends and extending through said transverse passages and slidable with respect to at least one of said clamp assemblies, said alignment rod being adapted for aligning said clamp assemblies through the opening and closing of said coupling tool;

a pair of alignment rod retainers each mounted on a respective alignment rod end; and said coupling tool including a pair of axles each mounted in a respective lever arm distal and rotatably mounting a respective clamp assembly, each said axle defining a respective rotational axis extending from front-to-back with respect to said tool.

* * * * *